(12) United States Patent
Kalkhoff

(10) Patent No.: US 9,145,265 B2
(45) Date of Patent: Sep. 29, 2015

(54) CONTROL UNIT FOR AN EGG CONVEYOR BELT

(71) Applicant: BIG DUTCHMAN INTERNATIONAL GMBH, Vechta (DE)

(72) Inventor: Christian Kalkhoff, Vechta (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

(21) Appl. No.: 14/177,333

(22) Filed: Feb. 11, 2014

(65) Prior Publication Data
US 2014/0224617 A1 Aug. 14, 2014

(30) Foreign Application Priority Data

Feb. 11, 2013 (DE) .......................... 20 2013 001 238

(51) Int. Cl.
*B65G 43/08* (2006.01)
*B65G 23/30* (2006.01)
*B65B 57/16* (2006.01)
*B65G 47/28* (2006.01)
*A01K 43/00* (2006.01)

(52) U.S. Cl.
CPC ................ *B65G 43/08* (2013.01); *A01K 43/00* (2013.01); *B65B 57/16* (2013.01); *B65G 23/30* (2013.01); *B65G 47/28* (2013.01); *B65G 2201/0208* (2013.01); *B65G 2203/041* (2013.01)

(58) Field of Classification Search
CPC ........ B65B 57/16; B65G 47/28; B65G 23/30; B65G 43/08; B65G 2201/0208; B65G 2203/041

USPC ............... 198/341.01, 341.03, 341.06, 459.8, 198/460.1, 572, 577, 579, 792
See application file for complete search history.

(56) References Cited

U.S. PATENT DOCUMENTS

| | | | |
|---|---|---|---|
| 6,401,936 B1 * | 6/2002 | Isaacs et al. | 209/656 |
| 6,484,886 B1 * | 11/2002 | Isaacs et al. | 209/539 |
| 7,191,895 B2 * | 3/2007 | Zeitler et al. | 198/460.1 |
| 8,360,230 B2 * | 1/2013 | Rompe | 198/460.1 |
| 2009/0020395 A1 | 1/2009 | Accettura | |

FOREIGN PATENT DOCUMENTS

| | | |
|---|---|---|
| DE | 2006004894 | 8/2007 |
| EP | 1856971 | 5/2007 |
| EP | 1 856 971 B1 | 11/2007 |
| JP | 2001287710 | 10/2001 |
| JP | 2007175027 | 12/2007 |
| NL | 1037320 | 9/2009 |
| WO | 2011136644 | 11/2011 |

* cited by examiner

*Primary Examiner* — Leslie A Nicholson, III
(74) *Attorney, Agent, or Firm* — Price Heneveld LLP

(57) ABSTRACT

The invention relates to a control unit for an egg conveyor belt, comprising a conveyor belt drive mechanically coupled with the conveyor belt and designed to drive the egg conveyor belt at one of at least two different speeds and an image recording unit to record an image section of the conveyor belt. An evaluation unit is coupled by means of signal technology to the image recording unit. A counting unit is designed to count all eggs detected in one image recording of the image recording unit on the image segment of the conveyor belt as stocking density, which is coupled by means of signal technology to an evaluation unit and to the conveyor belt drive, whereby the speed of the conveyor belt drive in dependence of the stocking density is controlled.

15 Claims, 2 Drawing Sheets

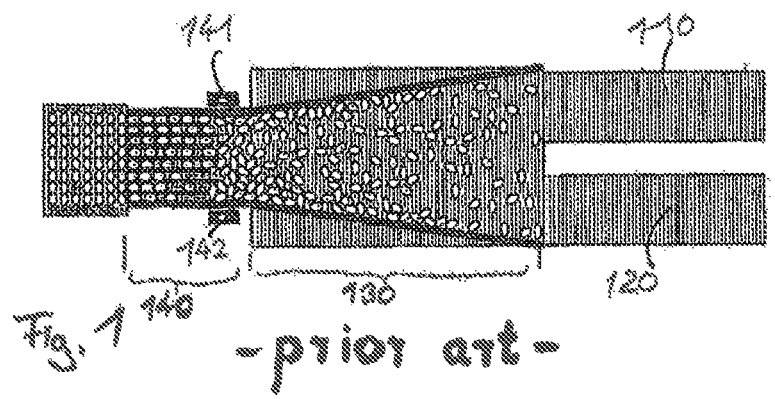
Fig. 1 -prior art-
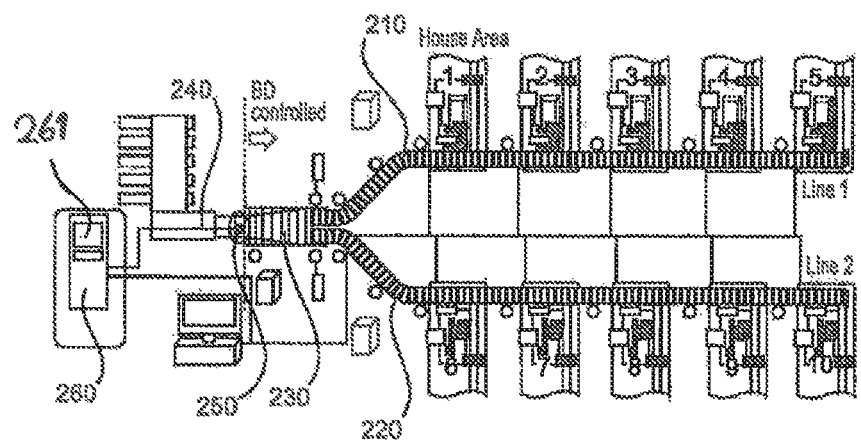
Fig. 2

CONTROL UNIT FOR AN EGG CONVEYOR BELT

CROSS-REFERENCE TO FOREIGN PRIORITY APPLICATION

The present application claims the benefit under 35 U.S.C. §119(b) of German Application No. 20 2013 001 238.2, filed Feb. 11, 2013, entitled "Control Unit for an Egg Conveyor Belt."

FIELD OF THE INVENTION

The invention relates to a control unit for an egg conveyor belt, comprising a conveyor belt drive mechanically coupled with the conveyor belt and designed to drive the egg conveyor belt at one of at least two different speeds and an image recording unit to record an image section of the conveyor belt. In particular, a conveyor belt arrangement with such a control unit is disclosed, along with a method to control the speed of an egg conveyor belt.

BACKGROUND OF THE INVENTION

Egg conveyor belts are used to transport eggs from the barn or nesting areas to a processing station, for example a packaging station, in egg-producing operations. In this context, an egg conveyor belt within the meaning of the description and the following claims is any conveying system that can transport eggs. In particular, these are endless conveying systems which are typically designed as endless conveyor belts and can consist of a plastic material. Other embodiments of conveying systems can be metal rods, linked chains, grids or grates.

A typical conveying system to collect eggs from several areas of a barn or to transport these eggs to one or several processing stations consists of a plurality of longitudinal conveyor belts, which run parallel to each other and on which the eggs are transported from the nesting areas directly from the livestock area of the egg-producing animal and one or more cross conveyor belts. Typically, the cross conveyor belts run vertically to the running direction of the longitudinal conveyor belts and transport the eggs conveyed from the longitudinal conveyor belts to the processing station.

A special problem in the transport is that egg production is naturally irregular and only to a certain extent statistically predictable, but cannot be predicted in its amount and timely distribution in the individual case, for example in regard to a longitudinal conveyor belts. Consequently, the collection of the eggs is operated by means of the conveyor with different amounts of eggs which have to be transported and, thus, different stocking density of the belts. In this context, stocking density means a stacking density, i.e., a parameter of the conveying process that is measured by the number of eggs per unit area.

Another specific problem of egg conveying systems is the fact that the structure of the eggs is extremely sensitive to damage. While the majority of eggs have a firm shell that is loadable to a certain extent, among the collected and transported eggs are also a small number of eggs with a thin shell, which are extremely sensitive to loads. Eggs, which are exposed to high conveying forces during the conveying process can be damaged and thereby cause contaminations of the conveying machinery, which, in turn, bring about additional problems through bonding effects. This applies in particular to eggs with very thin shells. For example, in the course of the conveying process, eggs are particularly sensitive to creating jams, in which the eggs cause high horizontal forces among themselves and which can result in damages to individual or multiple eggs.

EP 1 856 971 B1 specifies a counting apparatus which counts the eggs transported on a conveyor belt through line-by-line scanning. This counting apparatus is also described for the purpose to control a conveyor belt based on the counting result in such a way that a predetermined number of eggs is transported. It showed, in practice, that such a control of the conveyor belt in many conveying situations results in a transport that is free of damages based on needs; however, in some conveying situations a smooth operation of the conveyor belt cannot be avoided and thus poses the danger of damaging the eggs.

The problem of the irregular conveying process on the one hand and the dangers of damages on the other hand, in particular, has problematic effects on processing stations in regard to the control and adjustment behavior of such conveying systems. It is usually desired to generate a continuous flow of eggs at such processing station to be able to operate the processing station efficiently. While such a continuous flow of eggs in the area of the end of the conveying system leading into the processing station would best be solved with a jam of eggs formed in this location and its slow and continuous retrieval through the processing station, due to the danger of damages when transporting the eggs, this is not a practical solution.

The invention is based on the object to provide an egg conveyor belt which makes it possible to control an egg conveyor belt in such a way that while more reliably avoiding damages to eggs achieving a higher conveying rate or such with fewer interruptions than is known in prior art.

SUMMARY OF THE INVENTION

According to the invention, this objective is solved through a control unit of the aforementioned type characterized by an evaluation unit, which is coupled by means of signal technology to the image recording unit, having a counting unit designed to count all eggs detected in one image recording of the image recording unit on the image segment of the conveyor belt as stocking density, which is coupled by means of signal technology to an evaluation unit and to the conveyor belt drive and is designed to control the speed of the conveyor belt drive in dependence of the stocking density.

The control unit according to the invention achieves an advantageous control of the egg conveyor belt with an efficient transport while simultaneously protecting the eggs and significantly reducing the risk of breaking of the conveyed eggs. For this purpose, an image recording unit is used which records an image section of the conveyor belt. This image section can preferably extend across the entire width of the conveyor belt and comprise a portion of the length of the conveyor belt. The images recorded with the image recording unit are transmitted to an evaluation unit. This evaluation unit comprises a counting unit. The counting unit counts the number of eggs present within the image section in a single image recording. The result determined in this way provides a stocking density, i.e., information about the number of eggs per areal unit on the conveyor belt within the image section. While it is, in general, desirable to ideally utilize the area of the conveyor belt in such a way that the stocking density is high, the stocking density is, on the other hand, also an indirect criteria for the question if the danger of high contact forces between the individual eggs, groups of eggs, or all eggs exists within the image section.

According to the invention, the control process is based on an individual momentary recording and the thereof determined stocking density, which has proven to be a reliable criterion for the recording of beginning backups. In this context, the control or respective adjustment can in particular be carried out in such a way that the conveyor belt speed is changed if a certain limit of the stocking density is reached; even several limits can be stored in the control unit with corresponding differently tiered changes of the conveyor belt speed. In a further embodiment in this regard, the stocking density in a first point in time and the stocking density in a subsequent second point in time can be recorded and compared to one another and based on the thus determined stocking density change the conveyor belt can be adjusted, for example, if the stocking density change exceeds a predetermined limit.

The invention can be further developed through a differential unit which is designed to determine the number of eggs transported in a predetermined time period on the conveyor belt as the conveying rate from a sequence of image recordings and by the fact that the control unit is connected to the differential unit by means of signal technology and designed to control the speed of the conveyor belt drive, depending on the stocking density and the conveying rate. With the differential unit, a sequence of image recordings is evaluated and from this sequence it is determined which conveying rate is actually realized by the image section. The conveying rate can be determined from a sequence of image recordings in different ways. For example, it is possible to count the number of the eggs entering the image section in the conveying direction through several image sequences and to use it as the conveying rate for the further calculation by dividing this number by the duration which over-sweeps the sequence of image sections. The number of the eggs coming out of the image section in the conveying direction could also be counted across several image sequences and could, divided by the observation duration, be used as the base conveying rate for the further calculations. Another possibility would be to determine both parameters and to use the smaller of the thereby determined values as the conveying rate to obtain in this manner a minimum conveying rate determined across the length of the observed conveyor belt section. The conveying rate thus determined through one or the other or a combined or in yet another way from the image sequences is a measurement for the conveying efficiency of the system. In an ideal situation there is a linear connection between the stocking density, the conveyor belt speed, and the conveying rate; however, this ideal situation is not reached in practice due to the possible movements of the eggs on the conveyor belt itself. Due to the movements of the eggs on the conveyor belt itself there is always a difference to the ideal value that can be determined in such a way as the product of stocking density and conveyor belt speed and the actual conveying rate is typically lower than the theoretical conveying rate calculated in such a way.

According to the invention an adjustment unit is provided for which receives the stocking density and according to the further embodiment preferably in addition the conveying rate from the evaluation unit and generates a control and adjustment parameter from these which is used to control or respectively adjust the conveyor belt drive. Thus, according to the invention, the stocking density, preferably in addition to the conveying rate, is used as the initial parameter for an adjustment or control of the speed of the conveyor belt. This type of control achieves a control/adjustment which is superior compared to known controls or, respectively, adjustments of the conveyor belt speed which makes it possible to realize a high conveying rate based on effectively chosen initial parameters and thus to practically completely avoid damages to the eggs. In this, the invention consists of using an initial parameter for the adjustment which makes a characteristic prognosis for a beginning jam possible.

Preferably, two initial parameters are used, whereby the emphasis and calculation of the two initial parameters can be chosen in different ways depending on the type of the egg conveyor belt, for example its surface finish, the conveyor belt course in front of and behind the image section and the insertion behavior into the image section as well as the removal behavior from the image section. In this context, the calculation taking place within the adjustment unit can assume that an increasing stocking density at a consistent or decreasing conveying rate is an indication for a jam on the conveyor belt which makes it necessary that eggs are either transported out of the image section to a larger degree or added to the image section to a lesser degree. Thus, depending on whether the image section is arranged at the beginning of a conveyor belt or at the end of a conveyor belt, the conveying rate therefore has to be either increased (initial image section) or decreased (end image section) in such a situation. In the same way a consistent or increasing stocking density at a decreasing conveying rate also indicates a jam situation and requires corresponding adjustments.

Generally, it has to be understood that the conveyor belt speed can preferably be changed continuously. This has the advantage that speed changes, in particular a start-stop operation of the conveyor belt during the control or, respectively, adjustment, can be avoided and that instead an adjustment can be achieved that is gentle on both the conveyor belt drive as well as the transported eggs. This is especially supported based on the specifically chosen initial values of the adjustment. Correspondingly, the processing unit can preferable also be continuously adjusted or respectively controlled in regard to its processing speed.

Pursuant to a preferred embodiment it is provided for that the adjustment unit is designed to decrease the speed of the conveyor belt in case of the arrangement of the image section at the end of the conveyor belt or to increase the speed in case of the arrangement of the image section at the start of the conveyor belt if the stocking density has increased from one image recording to the subsequent image recording, in particular by a predetermined quota and/or the conveying rate has decreased in a sequence of image recordings to a subsequent sequence of image recordings, in particular that the image section is arranged in the end section of a conveyor belt and the adjustment unit is designed to reduce the speed of the conveyor belt, if the stocking density has increased from one image recording to a subsequent image recording, in particular by a predetermined quota and the conveying rate that has decreased or remained the same in a sequence of image recordings to a subsequent sequence of image recordings. This further embodiment generally achieves that a separate adjustment measure is performed with a specific evaluation of stocking density and/or conveying rate depending on the arrangement of the image section on the conveyor belt. In this context, the beginning of the conveyor belt has to be understood as the end section of the conveyor belt in the front in conveying direction and the end of the conveyor belt as the end section of the conveying belt at the rear in conveying direction. If the stocking density increases and/or the conveying rate decreases, typically a jam situation has to be recognized on the conveyor belt and the retrieval of eggs from the observed image section has to be increased or respectively the intake of eggs into the observed image section has to be decreased.

It is further preferred that the adjustment unit is designed to decrease the speed of the conveyor belt if the stocking density has exceeded a predetermined value in an image recording and/or if the conveying rate in an image recording has fallen short of a predetermined value. This adjustment which can be used in isolation or supplementary to the above referenced adjustment provides an adjustment measure or an adjustment impact based on an excess or shortfall of predetermined values for stocking density or respectively conveying rate. In this context, it has to be generally understood that also more than one limit can be determined as a predetermined value and that depending on exceeding of the one limit, of another limit or yet additional limits correspondingly different adjustment measures can then be taken. In general, this embodiment can also be designed in such a way that a limit is defined for a value which is mathematically calculated from the conveying rate and stocking density, for example, as quotient from stocking density and conveying rate, and that an adjustment is then made depending on the exceeding of a limit for such a value. In this context, this embodiment is designed for the arrangement of the image section at the end of the conveyor belt and it has to be understood that the speed of the conveyor belt can be increased in the same way if the image section is arranged at the start of a conveyor belt.

It is further preferred that the evaluation unit is designed to recognize an egg that enters into the image section, to follow the egg in several consecutive image recordings of an image sequence, and to determine from the distance traveled within the image section of the egg per time unit a movement speed of the egg and to output this as the conveyor belt speed, wherein preferably a plurality of eggs is recognized and followed and a mean value is calculated from the thus determined movement speed of the eggs and output as conveyor belt speed, wherein a movement speed of an egg which deviates by a predetermined difference from the mean value preferably remains unconsidered and a corrected calculation of the conveyor belt speed is made in determination of the mean value of the remaining movement speeds of the eggs. By means of the image recording and evaluation unit this further embodiment directly determines a relevant initial parameter for the adjustment or control behavior of the control unit, namely the conveyor belt speed. This is achieved by recognizing the eggs, for example by a gray value or contour analysis and following these eggs to determine a speed of the eggs. For this purpose, generally one egg can be used to determine the conveyor belt speed. However, it is preferred to use several eggs to obtain a secure basis for the calculation. Eggs, which in their speed deviate from the speed of other eggs, i.e., are significantly above or below the mean value, are herein taken out of the calculation, since it has to be assumed that these eggs move on the conveyor belt and consequently do not provide a suitable parameter to determine the conveyor belt speed. This improved precision of the calculation can, for example, be performed as iterative calculation in one, two, or more steps by recalculating the mean value through the recorded and tracked eggs after taking out a corresponding strongly deviating egg to then again take out an egg which deviates from this recalculated mean value in a significant way, if applicable.

It is still further preferred that the image recording unit is arranged and aligned to record an image section of the conveyor belt in the end section of the conveyor belt that leads into the processing unit. According to this embodiment, the image recording unit is arranged in such a way that it monitors the conveyor belt in the end region before the processing unit. At this, the processing unit can be a packaging station, sorting station or something similar and can in particular be controllable or adjustable in regard to its processing speed at least between two speeds.

In this context, it is especially preferred that the control unit is connected with the processing unit by means of signal technology and is designed to receive a signal characterizing a processing, a processing speed and/or a stop of the processing unit and to control the conveyor belt drive depending on this signal. This further embodiment makes it possible for the control unit to control the conveyor belt drive depending on the operating condition of the processing unit. For example, changes in the operating condition of the processing unit can be addressed directly, before these have caused a jam on the conveyor belt or before they have resulted in a supply performance that is too low, if the processing of the eggs is reduced or respectively increased in the processing unit.

It is further preferred that the control unit is connected to the processing unit by means of signal technology and that the adjustment unit is designed to control depending on the stocking density and the conveying rate of the processing unit in addition to or alternatively to the speed of the conveyor belt drive, in particular to adjust the processing speed of the processing unit. This further embodiment enables the control unit in to send a control or adjustment signal to the processing unit itself to react to certain recorded situations. For example, the processing speed of the processing unit can be increased with this further embodiment through the control unit, if a jam situation is determined in the supply area to the processing unit or the processing speed can be reduced if a jam is recorded in a conveyor belt segment behind a processing unit.

Finally, the conveyor belt arrangement can be further embodied with the control unit according to the invention by connecting two or more conveyor belts with the processing unit to supply eggs, by driving each of the conveyor belts with one conveyor belt drive each, whose speed is controlled in each case with an adjustment unit, which is connected to an evaluation unit by means of signal technology and an image recording unit to record a conveyor belt segment of the respective conveyor belt. This further embodiment makes it possible to supply eggs from different areas of a barn to a processing unit and to record them independently from another and to avoid jam situations for the conveyor belt in this process, which transport the eggs from the different areas. The differentiated adjustment can, for example, be performed on several conveyor belts which are arranged on top of each other or next to each other and running parallel by recording, evaluating and regulating image sections on each conveyor belt in the above described manner through the control unit or respectively using them for an adjustment in each case.

Another aspect of the invention is a method to control the speed of an egg conveyor belt in these steps: Driving of a conveyor belt drive in at least two different speeds, recording through a image recording unit, counting of the eggs recorded in an image recording of the image recording unit on the image section of the conveyor belt as stocking density by means of a counting unit and adjusting of the conveyor belt drive speed depending on the stocking density through an adjustment unit. The method according to the invention achieves, preferably using the above explained control units or respectively arrangement of the conveyor belt according to the invention, an especially efficient transport of eggs while reliably avoiding damages to the eggs.

The invention can, in particular, be further developed through the step of determining the number of eggs transported in a predetermined time period on the conveyor belt as the conveying rate from a sequence of image recordings by means of a differential unit and adjusting the speed of the conveyor belt drive depending on the stocking density and the conveying rate.

In this context, the advantages and further embodiments of the method can be realized corresponding to the embodiments of the previously described control unit. In particular, the method can include the step wherein the speed of the conveyor belt is reduced if the stocking density is increased from one image recording to a subsequent image recording, in particular by a predetermined quota, and/or if the conveying rate is decreased from one sequence of image recordings to a subsequent sequence of image recordings. In particular, the speed of the conveyor belt is reduced if the stocking density increases from one image recording to a subsequent image recording, preferably by a predetermined quota, and the conveying rate decreases from one sequence of image recordings to a subsequent sequence of image recordings or has remained the same. Further, the speed of the conveyor belt may be decreased if the stocking density has exceeded a predetermined value in an image recording and/or if the conveying rate in an image recording has fallen short of a predetermined value.

Additionally, an egg that enters into the image section may be recognized, tracked in several consecutive image recordings of an image sequence, and a movement speed of the egg determined from the distance traveled within the image section of the egg per time unit, the output of which can be used to determine the conveyor belt speed. Preferably a plurality of eggs is recognized and followed and a mean value is calculated from the determined movement speed of the eggs to determine the conveyor belt speed, where a movement speed of an egg which deviates by a predetermined difference from the mean value preferably remains unconsidered and a corrected calculation of the conveyor belt speed is made in determination of the mean value of the remaining movement speeds of the eggs.

The method may also include the step of recording an image section of the conveyor belt in an end section of the conveyor belt that leads into the processing unit and controlling the conveyor belt drive depending on the processing, a processing speed and/or a stop of the processing unit, wherein control of the processing unit depends on the stocking density and the conveying rate in addition to or as an alternative to the speed of the conveyor belt drive, in particular adjusting the processing speed of the processing unit.

Finally, two or more conveyor belts may be connected to a processing unit to supply eggs, with the additional steps of driving the respective conveyor belts with a conveyor belt drive, and adjusting of the speed of each conveyor belt drives by an adjustment unit connected to an evaluation unit and an image recording unit by signal technology to record a conveyor belt section of the respective conveyor belt. Thus, the embodiments and advantages of these further embodiments of the method to the previously described corresponding description of the control unit or respectively conveyor belt arrangement can be obtained.

BRIEF DESCRIPTION OF THE DRAWINGS

The invention is further described based on the below explained embodiments with reference to the figures. The following is shown in:

FIG. 1 is a schematic top view on the inflow of an egg grading machine;

FIG. 2 is a schematic view of the structure of an egg-producing operation;

DETAILED DESCRIPTION OF THE PREFERRED EMBODIMENTS

Figure 3:
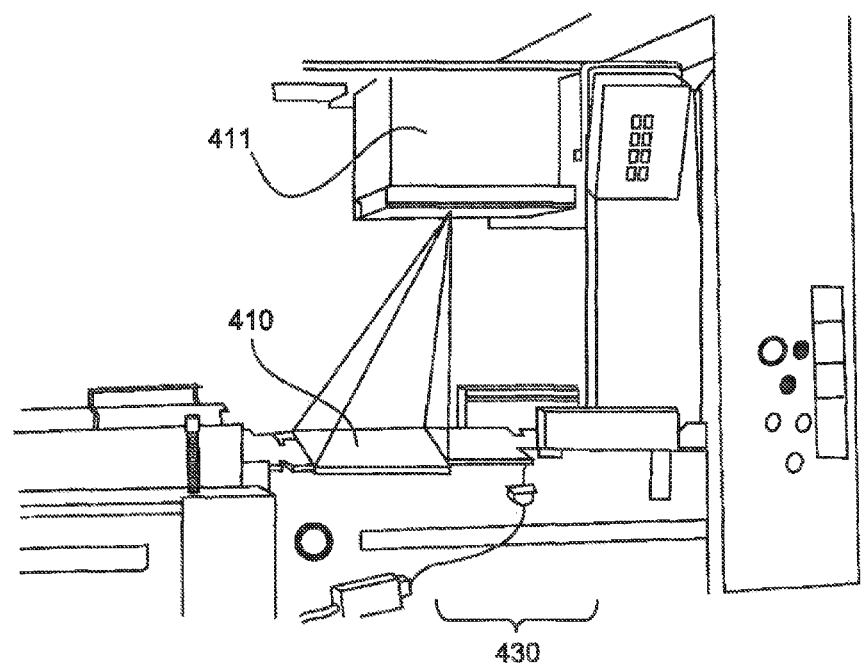
FIG. 3 is aside view of an exemplary embodiment of the control unit according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the general structure of the inflow into a grading machine is shown at the end of a conveyor track for eggs. In this end region, the conveyor track has two supply belts 110, 120, which transport the eggs into a redistributor 130. The eggs collect in this redistributor 130 and are guided into individual lines, which are separated from one another in a guide area 140 by dividers, to be packaged in an orderly manner after grading. The here described embodiment has a sensor 141, 142 to measure the lateral force according to prior art in the inflow area which affects horizontally measuring force sensors through corresponding attached semi-rounded contact plates and thus shall present a measurement for the pressure force affecting the eggs in case of a jam in the inflow area.

FIG. 2 shows a schematic view of the overall structure of an egg-producing operation, There is a total of ten barn areas 1-10 which produce eggs and transport these eggs by way of corresponding longitudinal belts to a total of two cross conveyor belts 210, 220. Then, the cross conveyor belts 210, 220 transport the eggs away from these barn areas to an inlet funnel 230 into a processing station 240. In turn, in the processing station the eggs are correspondingly supplied to a grading and packaging unit through the inlet funnel.

An image recording unit 250 is arranged and aligned in conveying direction at the end of the inlet funnel 230 to record a section from the conveying section in this end section. This image recording unit 250 transmits the images recorded by it to an evaluation and adjustment unit 260, which is designed to determine a stocking density from an individual image recording and a conveying rate, as well as a conveyor belt speed, from a sequence of individual images. The evaluation and adjustment unit 260 is connected to a differential unit 261 and receives signals from other apparatuses connected to it. These signals can be divers, for example operating signals can be received not only from the grading and packaging unit, but also counting signals from the individual barn areas 1-10, which signal how many eggs are waiting there on the longitudinal belts for transport and other signals. The evaluation and adjustment unit counts all eggs which enter into the image section and tracks them in the image. Furthermore, it is recorded how many eggs are transported through the image section and this value is outputted as the amount of eggs in eggs/hour. Furthermore, the evaluation and adjustment unit records the number of all eggs in the individual image and receives signals determining whether the grading machine is operating, if the conveyor belt is running, and the belt speed inside the grading machine.

FIG. 3 shows in a side view an image recording unit 410, which records an image section 411. The image section 411 extends along the entire width of the conveyor track in the area of the inlet funnel 430 and along a portion of its length. The image recording unit is arranged above the inlet funnel.

Figure 4:
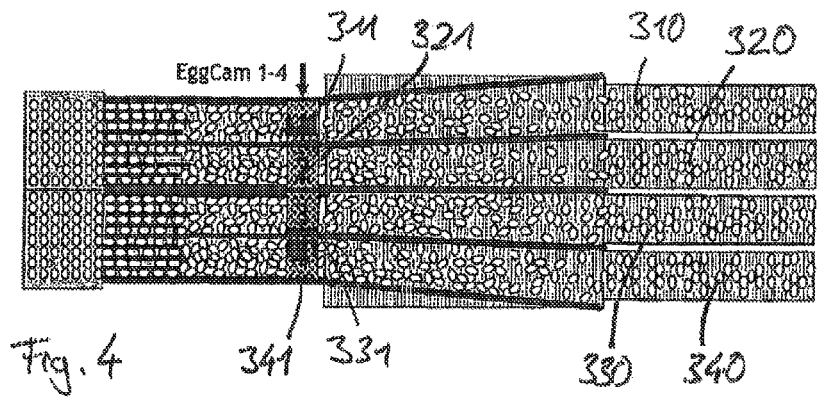
FIG. 4 is a top view of a further embodiment of the invention.

In the presented example, two cross conveyor belts are shown, which supply into one single grading machine. Generally, it has to be understood that a single cross conveyor belt or more than two cross conveyor belts, for example four cross conveyor belts can be collected separately in the same manner and the images can be recorded accordingly. FIG. 4 shows an embodiment in which the eggs are collected with a total of four cross conveyor belts 310, 320, 330, 340 and are supplied to a grading machine in an inlet funnel. In this case, four individual image sections 311, 321, 331, 341 are recorded in the rear section of the inflow funnel, whereby the cross conveyor belts in this inflow funnel are kept separately. The four individual image sections 311, 321, 331, 341, which can be recorded by four separate image recording units or in a summarized form by a single or two image recording units then make it possible that the conveyor belt speed of each individual cross conveyor belt is regulated individually depending on the respective jam situation or deficiency situation of eggs in the respective image section.

Thus, the control unit and control method according to the invention make it possible to achieve a continuous adjustment of several independent cross conveyor belts with individual adjustment of each inflow area. To this end, a set point value can be established which shall in total be achieved by the different cross conveyor belts and this value shall be proportionally distributed to the individual tracks. The current value per track determined by the image recording and evaluation is harmonized through a fast mean value generation. Through outputs and corresponding control inputs or bus transmissions, the set point value is preset for a corresponding competent frequency transformer, which serves as the control input for the conveyor belt drive. At this, each of the several adjustments works self-sufficiently and is synchronized through the control unit according to the invention by adjusting the individual set point values.

A beginning jam is recognized early by combining the conveying rate and stocking density of the eggs. If the number of eggs in the image increase at a simultaneously constant or decreasing number of eggs per hour (conveying rate), then a beginning jam has to be expected. The speed of the horizontal belt can be reduced according to the eggs counted in excess. The degree of this reduction can be adjusted continuously through an adjustment factor.

The belt speed is determined by tracking one or several eggs. This can, for example, be done by determining the position of an egg that first enters into the image section and is recognized in four subsequent images and calculating the speed of the egg based on this. If several eggs are simultaneously recorded and evaluated, this can be done in such a way that the speed of eggs which deviate strongly from the other egg speeds, are removed from the observation to determine the conveyor belt speed reliably by doing so.

According to the invention it is made possible that the egg stream is automatically adjusted to the output of the grading machine. This can, on the one hand, be done self-sufficiently and independent of signals of the grading machine by measuring the respective jam condition and adjusting it close to a conveyor rate maximum while avoiding jam conditions. This can be done in another manner when signals enter from the grading machine into the control and conveying rate or respectively conveyor belt speed is adjusted according to the need of the grading machine.

Furthermore, according to the invention, additional alarms or warnings can be generated which can be used to optimize the control and enable a user to avoid errors before they occur or to recognize occurred errors. For example, an egg jam that already exists at start up can be recognized and in such a case the control can be operated in another module to make the start up process possible. Furthermore, it can be recorded if, despite the operation of the belts, no eggs are transported into the image section, which indicates damage to the conveyor belt drive, a possible rip of a chain or something similar. Furthermore, large gaps of eggs on the horizontal belt can be recognized and this can be used in subsequent collection processes to optimize the collection process through corresponding control of the longitudinal conveyor belts in individual barn areas and to avoid such gaps.

According to the invention, it is achieved that the egg pressure in a random location in a conveying system for eggs can be reliably reduced, in particular where eggs are isolated in the inlet funnel in front of a grading machine or such. The contamination of the entire system, in particular of the egg packaging and grading system, is significantly reduced; this is in particular also achieved when thin-shelled eggs are processed. The constant transport with continuous adjustment of the conveyor belt speed which is possible according to the invention saves all drive systems along the entire egg transport track, as well as the eggs themselves, which are transported on it. The control unit is in particular advantageous, because the collection times of the eggs can be reduced through the optimized adjustment. Due to the precise adjustment according to the invention, it is no longer necessary for a reliable utilization of a grading machine or other processing units to keep a large number of eggs on the transportation route to avoid gaps. Instead, tailored to the needs, that amount of eggs can be supplied to the processing machine at any point in time that can there be processed. This avoids eggs being exposed too long to environmental influences like heat or cold on the conveyor belt. This can increase the quality of the collected, graded, and packaged eggs.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A control unit for a first egg conveyor belt, comprising:
   a conveyor belt drive mechanically connected to the first egg conveyor belt for driving the egg conveyor belt at one of at least two different speeds,
   an image recording unit for recording a predetermined image section of the first egg conveyor belt,
   an evaluation and adjustment unit connected to the image recording unit by signal technology, the evaluation and adjustment unit further comprising a counting unit designed to count all eggs recorded in a single image recording of the image recording unit in the image section of the first egg conveyor belt as a stocking density, and
   the evaluation and adjustment unit being connected to the conveyor belt drive by signal technology to adjust the speed of the conveyor belt drive depending on the stocking density, wherein the evaluation and adjustment unit is designed to recognize an egg that enters into the image section, to follow the egg in several consecutive image recordings of an image sequence and to determine from the distance traveled within the image section of the egg per time unit a movement speed of the egg and to output the distance traveled within the image section of the egg per time unit as the conveyor belt speed;

wherein a plurality of eggs is recognized and followed and a mean value is calculated from the determined movement speed of the eggs and is outputted as the conveyor belt speed, and wherein a movement speed of an egg which deviates by a predetermined difference from the mean value remains unconsidered and a corrected calculation of the conveyor belt speed is made in determination of the mean value of the remaining movement speeds of the eggs.

2. The control unit according to claim 1, further comprising:

a differential unit designed to determine the number of the eggs transported on the first egg conveyor belt in a predetermined time period as a conveying rate from a sequence of image recordings, wherein the evaluation and adjustment unit is connected to the differential unit by signal technology and is designed to adjust the speed of the conveyor belt drive depending on the stocking density and the conveying rate.

3. The control unit according to claim 1, wherein the evaluation and adjustment unit reduces the speed of the first egg conveyor belt if the stocking density from one image recording increases relative to the stocking density of a subsequent image recording or if the conveying rate decreases in a sequence of image recordings to a subsequent sequence of image recordings, wherein the image section is arranged in an end section of the first egg belt and the adjustment unit is designed to reduce the speed of the first egg conveyor belt.

4. The control unit according to claim 1, wherein the evaluation and adjustment unit reduces the speed of the first egg conveyor belt if any or each of the stocking density increases from one image recording to the stocking density of a subsequent image recording by a predetermined quota or the conveying rate decreases from one sequence of image recordings to a subsequent sequence of image recordings or has remained the same.

5. The control unit according to claim 1, wherein the evaluation and adjustment unit is designed to reduce the speed of the first egg conveyor belt if any or each of the stocking density has exceeded a predetermined value in an image recording or if the conveying rate in an image recording has fallen short of a predetermined value.

6. The conveyor belt arrangement with a control unit according to claim 1, further comprising:

a processing unit with a second egg conveyor belt and the first egg conveyor belt that transports eggs to the processing unit, wherein the image recording unit is arranged and aligned to record an image section in a starting area of the second egg conveyor belt, whereby the control unit is connected with the processing unit by means of signal technology and is designed to receive a signal corresponding to any or all of a processing signal, a processing speed signal, or a stop of the processing unit signal to control the first egg conveyor belt drive.

7. The conveyor belt arrangement according to claim 6, wherein the control unit is connected to the processing unit by means of signal technology and the adjustment unit controls the speed of the first and second egg conveyor belts depending on any or all of the stocking density, the conveying rate of the processing unit, or the speed of either the first and second egg conveyor belts to adjust the processing speed of the processing unit.

8. The conveyor belt arrangement according to claim 6, wherein an adjustment unit is provided for each of the first and second egg conveyor belts to control the speed of the first and second egg conveyor belts, each of the adjustment units being connected to an evaluation unit by means of signal technology and an image recording unit to record a conveyor belt segment of the respective egg conveyor belt.

9. A method for controlling the speed of a first egg conveyor belt, including the steps of:

driving a conveyor belt drive at one of at least two different speeds, recording an image section of the first egg conveyor belt by an image recording unit, counting the eggs recorded in a single image recording of the image recording unit on the image section of the first egg conveyor belt as a stocking density by a counting unit, and adjusting the speed of the first egg conveyor belt drive depending on the stocking density by an adjustment unit, wherein an egg that enters into the image section is recognized, tracked in several consecutive image recordings of an image sequence, and a movement speed of the egg is determined from the distance traveled within the image section of the egg per time unit and output as the conveyor belt speed, wherein a plurality of eggs is recognized and followed and a mean value is calculated from the determined movement speed of the eggs and output as a conveyor belt speed, and wherein a movement speed of an egg which deviates by a predetermined difference from the mean value preferably remains unconsidered and a corrected calculation of the conveyor belt speed is made in determination of the mean value of the remaining movement speeds of the eggs.

10. The method according to claim 9, further including the steps of:

determining the number of the eggs transported on the first egg conveyor belt in a predetermined time period as a conveying rate from a sequence of image recordings by a differential unit, and adjusting of the speed of the conveyor belt drive depending on any or each of the stocking density or the conveying rate by an adjustment unit.

11. The method according to claim 9, wherein the speed of the first egg conveyor belt is reduced if any or each of the stocking density increases from one image recording to a subsequent image recording or the conveying rate decreases from one sequence of image recordings to a subsequent sequence of image recordings.

12. The method according to claim 9, wherein the speed of the first belt is reduced if any or each of the stocking density increases from one image recording to a subsequent image recording by a predetermined quota or the conveying rate decreases from one sequence of image recordings to a subsequent sequence of image recordings or has remained the same.

13. The method according to claim 9, wherein the speed of the first egg conveyor belt is reduced if any or each of the stocking density has exceeded a predetermined value in an image recording or if the conveying rate in an image recording has fallen short of a predetermined value.

14. The method according to claim 9, further including the step of:

recording an image section of the first egg conveyor belt in an end section of the first egg conveyor belt that leads into the processing unit and controlling the conveyor belt drive depending on any or all of the processing, processing speed, or a stop of the processing unit, and wherein control of the processing unit depends on the stocking density and the conveying rate in addition or in alternative to the speed of the conveyor belt drive in adjusting the processing speed of the processing unit.

15. The method according to claim 9, wherein two or more egg conveyor belts are connected to a processing unit to supply eggs, with the additional steps of driving each egg conveyor belt with a conveyor belt drive and adjusting the speed of each conveyor belt drive by an adjustment unit connected to an evaluation unit and an image recording unit by signal technology to record a conveyor belt section of the respective egg conveyor belt.

* * * * *